Patented Apr. 28, 1942

2,280,934

UNITED STATES PATENT OFFICE 2,280,934

PROCESS OF PREPARING SYNTHETIC RESIN MOLDING MATERIALS CONTAINING FILLERS

Fritz Seebach, Erkner, near Berlin, Germany, assignor, by mesne assignments, to Bakelite Corporation, a corporation of New Jersey No Drawing. Application May 12, 1938, Serial No. 207,510. In Germany May 15, 1937

14 Claims. (Cl. 260—38)

It is well known that synthetic resin molding materials can be prepared by the thorough admixture of synthetic resins and fillers with the addition of coloring materials, hardening agents, plasticizers and other customarily added substances. Thus the usual fillers heretofore incorporated have been for example, pulverized or fibrous organic or inorganic materials such as wood flour, shredded substances, asbestos fibers, and the like. A proportion of approximately one part of filler to one part of resin cannot be exceeded generally without adversely affecting fabrication of molded articles. This can be explained by the absorptiveness of the filler which has prevented further increase in the quantity of filler and a consequent saving of resin.

It has now been found that by the simple process described herein it is possible to increase to a very substantial extent the amount of filler which can be incorporated, thereby saving large amounts of resin and at the same time obtain molded articles having improved mechanical and electrical properties. Furthermore discoloration of the finished molded article does not occur.

The process of this invention lies in the use of a filler or filler mixture which, prior to being incorporated with the resin, has its density increased as much as is possible whereby the volume of the filler is reduced and a correspondingly great reduction in resin absorption results. This increase in density is provided by subjecting the filler to a preliminary treatment by which a compression and a reduction in volume of the individual fibers takes place while their surfaces are at the same time made smooth. In this manner a filler having a much smaller volume than the original material and hence a greatly increased density is prepared. Whereas, for instance, the density of ordinary wood flour is 16 grams per 100 ccm., the density of wood flour treated in accordance with the present process has a value of 40 grams per 100 ccm. The filler is thus compressed to almost one-third its original size.

The following specific example explains the process:

Wood flour _____grams__ 1650
Water _____cubic centimeters__ 300
Pulverized novolak or resole_____grams__ 45 are mixed. The mixing is accomplished either by simple stirring or by grinding the ingredients. Water is added, in the first place, for the purpose of preventing dust to be formed during the operation as this would be objectionable. Furthermore by the addition of water the adhesive effect of the admixed resins is increased. The novolak or the resole can be added either as a powder or in any other suitable form, for example, as an emulsion, or an alkaline or alcoholic solution. The purpose of this addition is to secure adherence of the wood flour on the rolls during a subsequent calendering operation. A brittle sheet will essentially be formed which in the end comes off from the rolls. It is also possible to work the wood flour without water and without resin in which case it takes more time to form the sheet and the latter will be uneven. The percentage of novolak or other adhesive material rolled in with the wood flour ranges from 2-10%. In the manufacture of molding compositions the content of novolak will be calculated as resin. The wood flour is very highly compressed to a relatively high density by placing the rolls as close as possible while simultaneously undergoing a drying (operation) preferably by the aid of heated calender rolls. For the purpose of securing adequate compression the setting of the rolls should not exceed $\frac{1}{8}$ of an inch. This drying operation can be carried on to such a degree that not only the water added to the mixture but also the water originally contained in the wood flour is removed or practically removed. The filler is then pulverized and used in this form or in admixture with other similarly and correspondingly compressed fillers as addition material for the fabrication of molded articles.

Even those molding materials utilizing fillers produced by this method so as to have a very high content of filler have surprisingly good commercial flow characteristics. As shown in the following table, the flow characteristics obtained by using wood flour compressed according to this invention are reduced for example in the case of a molding mixture containing approximately 20% of synthetic resin and then only in comparison with molding materials that are richer in resin:

| Proportion of resin and wood flour | Cup closing time |
|---|---|
| | Seconds |
| 1:1 | 10 |
| 1:2 | 9 |
| 1:3 | 12 |
| 1:4 | 17 |

These cup closing times were determined without preheating the molding materials. Considering the plasticity of the molding materials as disclosed by the cup closing time and the low resin content, the brilliancy and the good surface of the resulting molded articles are remarkable and surprising.

In accordance with this process it is possible to produce considerably more molding materials than heretofore from a given quantity of resin. Taking a molding mixture containing 25% resin, as an example, there is obtained with the same quantity of resin double the quantity of molding material by weight as heretofore obtained with a 50% resin content.

During the preliminary treatment of the filler, hexamethylenetetramine as well as coloring materials, plasticizers and other fillers can be incorporated in the mixture. Hexamethylenetetramine is included in the filler only when novolaks or slowly hardening resoles are to be added.

Additional examples for the treatment of fillers in accordance with the invention are as follows:

Example 1

| | |
|---|---|
| Wood flour _____ grams__ | 1650 |
| Hexamethylenetetramine _____ do__ | 180 |
| Water _____ cubic centimeters__ | 300 |
| Novolak _____ grams__ | 45 | are mixed and treated on a heated calender as described above. The product is ground as fine as possible. Its density increases from 16 g. to 40 g. per 100 ccm. On account of the extremely fine distribution of hexa by this method, molded pieces with a much better surface are obtained when made from compositions with added resin binder as set out in Example 5 than those made by methods heretofore employed.

Example 2

| | |
|---|---|
| Wood flour _____ grams__ | 1240 |
| Lithopone _____ do__ | 410 |
| Novolak _____ do__ | 45 |
| Water _____ cubic centimeters__ | 300 | are rolled on a heated calender. The mass is removed as soon as its density is sufficiently high.

Example 3

| | |
|---|---|
| Wood flour _____ grams__ | 1240 |
| Lithopone _____ do__ | 410 |
| Novolak _____ do__ | 45 |
| Water _____ cubic centimeters__ | 300 |
| Yellow dye _____ | 1.6 | are mixed and compressed as described above.

Example 4

| | |
|---|---|
| Wood flour _____ grams__ | 1240 |
| Lithopone _____ do__ | 410 |
| Novolak _____ do__ | 45 |
| Water _____ cubic centimeters__ | 300 |
| Sudan red _____ grams__ | 1.8 | are treated as above and the finished filler is then ground.

Besides novolak or resole, other materials, such as starch or glue, can be used as cementing substances in the densified filler. It is also possible to carry out this process without these addition materials; but then an automatic device should be provided which returns the loose filling powder to the action of the rolls. A calendering machine is the most suitable equipment for carrying out this process; the process can also be carried out however, by means of other devices that are capable of densifying the filler, such as presses and the like. According to the method described herein not only can wood flour be treated by which the results of the process of the present invention are particularly made apparent, but in general other compressible organic or inorganic fillers, preferably of a fibrous structure, such as shredded materials, textiles, asbestos fibers and the like.

The following examples describe the preparation of molding materials using these densified fillers:

Example 5

| | Parts |
|---|---|
| Novolak _____ | 38 |
| Filler according to Example 1 _____ | 100 |
| Lithopone _____ | 10 |
| Sudan red _____ | 1 |
| Stearic acid _____ | 0.2 | are worked up together on the calender rolls without difficulty. The sheet comes off readily. The sheet is not telescoped on the rolls before it is finished. Its cup closing time is 14 seconds. The ratio of resin and filler is 1:2.

Example 6

| | Parts |
|---|---|
| Phenol-resole _____ | 46 |
| Filler according to Example 2 _____ | 93 |
| Stearic acid _____ | 0.5 |
| Yellow dye _____ | 0.4 | are worked up as above. Its cup closing time is 12 seconds. The ratio of resin and filler is 1:2.

Example 7

| | Parts |
|---|---|
| Filler according to Example 3 _____ | 70 |
| Novolak _____ | 60 |
| Hexamethylene tetramine _____ | 10 |
| Stearic acid _____ | 1.4 |
| Yellow dye _____ | 0.2 | are mixed. Its cup closing time is 10 seconds. The ratio between resin and filler is 1:1.

Example 8

| | Parts |
|---|---|
| Filler according to Example 3 _____ | 210 |
| Novolak _____ | 60 |
| Hexamethylenetetramine _____ | 10 |
| Stearic acid _____ | 0.4 |
| Yellow dye _____ | 0.8 | are mixed. Its cup closing time is 12 seconds. The ratio between resin and filler is 1:3.

Example 9

| | Parts |
|---|---|
| Filler according to Example 3 _____ | 210 |
| Novolak _____ | 60 |
| Hexamethylenetetramine _____ | 10 |
| Stearic acid _____ | 0.4 |
| Sudan red _____ | 0.6 | are mixed. Its cup closing time is 13 seconds. The ratio between resin and filler is 1:3.

Example 10

| | Parts |
|---|---|
| Filler according to Example 3 _____ | 280 |
| Novolak _____ | 60 |
| Hexamethylenetetramine _____ | 10 |
| Stearic acid _____ | 0.4 |
| Sudan red _____ | 0.8 | are mixed. Its cup closing time is 17 seconds. The ratio between resin and filler is 1:4.

Example 11

| | Parts |
|---|---|
| Filler according to Example 4 _____ | 280 |
| Hexamethylenetetramine _____ | 60 |
| Stearic acid _____ | 0.4 |
| Sudan red _____ | 0.8 | are mixed. Its cup closing time is 20 seconds. If molding material is preheated, the cup closing time of 20 seconds is reduced to 10 seconds. The ratio between resin and filler is 1:4.

The materials richest in filler, (see Examples 9-11) can also be prepared without stearic acid.

The densified fillers prepared according to the process described are, of course, suitable for use with resins other than the phenol-formaldehyde resins of the above examples. They can be admixed with other synthetic resins, for example, urea resins prepared according to German Patents Nos. 579,748 and 595,462, or various other synthetic resins. These densified fillers are also suitable for incorporation with natural resins or with rubber to produce materials with similar properties.

What is claimed is:

1. Process of preparing a moldable composition from a filler of loose absorptive fibers and about 20 to 50 per cent of a binder which comprises densifying the loose fibrous filler containing not more than 2 to 10 per cent of adhesive by highly compressing between rolls into sheet form to cause a material reduction in volume of the fibers with a decrease in absorptiveness, grinding the densified sheeted filler, and incorporating a binder with the densified filler in amount to provide a composition having from about 20 to 50 per cent of the binder.

2. Process according to claim 1 in which the binder is a heat-hardening resinous composition.

3. Process according to claim 1 in which the compressive action of the rolls is secured by a setting of not more than three-sixteenths of an inch apart.

4. Process according to claim 1 in which the filler is densified by compression to less than one-half its volume.

5. Process of preparing a moldable composition from a filler of loose absorptive fibers and about 20 to 50 per cent of binder which comprises densifying the loose fibrous filler by highly compressing between rolls into sheet form with a material reduction in volume of the fibers and decrease in absorptiveness, adherence to the rolls being promoted by the addition of from about 2 to 10 per cent of an adhesive to the filler, grinding the densified sheeted filler, and incorporating a binder with a densified filler in amount to provide a composition having from about 20 to 50 per cent of the binder.

6. Process according to claim 5 in which the adhesive is a novolak.

7. Process of preparing a moldable composition from a filler of loose absorptive fibers and about 20 to 50 per cent of a binder which comprises densifying the loose fibrous filler by highly compressing between rolls into sheet form with a material reduction in volume of the fibers and decrease in absorptiveness, adherence to the rolls being promoted by the addition of from about 2 to 10 per cent of an adhesive and water to the filler, grinding the densified sheeted filler, and incorporating a binder with the densified filler in amount to provide a composition having from about 20 to 50 per cent of the binder.

8. Process according to claim 7 in which the rolls are heated to a temperature to cause drying of the composition during the rolling.

9. Process according to claim 7 in which about 300 parts of water are added to from about 1240 parts to 1650 parts of fibrous filler when the filler is wood flour.

10. Molding composition comprising in combination a wood flour filler of an apparent density approximating 16 grams per 100 cc. densified by compression to an apparent density of about 40 grams per 100 cc., said filler having incorporated therein a novolak, and a heat-hardening resinous binder added to the densified filler, said binder constituting from 20 to 50 per cent of the composition.

11. Molding composition comprising in combination a compressible loose fibrous type of filler containing not more than 2 to 10 per cent of adhesive densified by compression to less than one-half in volume and a heat-hardening resinous binder added to the densified filler constituting from 20 to 50 per cent of the composition.

12. Molding composition comprising in combination wood flour containing not more than 2 to 10 per cent of adhesive densified to less than one-half its volume by compression and having incorporated therein a small proportion of an agent for promoting densification, and a binder therefor.

13. Molding composition comprising in combination wood flour densified by compression to less than one-half its volume and having incorporated therein as an adhesive a novolak in amounts ranging from two to ten per cent, and a binder therefor.

14. Molding composition comprising in combination a compressible loose fibrous filler densified by compression to less than one-half in volume and having incorporated therein as an adhesive a novolak, and a binder for the densified filler.

FRITZ SEEBACH.